US008797942B2

(12) United States Patent
Blomgren et al.

(10) Patent No.: US 8,797,942 B2
(45) Date of Patent: Aug. 5, 2014

(54) RANDOM ACCESS WITH FULL COVERAGE ON SELECTED RESOURCES

(75) Inventors: Mats Blomgren, Solna (SE); Fredrik Gunnarsson, Linköping (SE); Bo Hagerman, Tyresö (SE); Klas Johansson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 12/567,207

(22) Filed: Sep. 25, 2009

(65) Prior Publication Data

US 2011/0075636 A1    Mar. 31, 2011

(51) Int. Cl.
*H04B 7/212*    (2006.01)

(52) U.S. Cl.
USPC ........... 370/321; 370/326; 370/337; 370/348; 370/442

(58) Field of Classification Search
USPC .................. 370/321, 326, 337, 347, 348, 442
See application file for complete search history.

(56) References Cited

U.S. PATENT DOCUMENTS

| 2004/0165559 | A1* | 8/2004 | Kwak et al. ................... 370/335 |
| 2005/0271025 | A1* | 12/2005 | Guethaus et al. ............. 370/342 |
| 2006/0073791 | A1* | 4/2006 | Senarath et al. ........... 455/67.13 |
| 2008/0242308 | A1* | 10/2008 | Gunnarsson et al. ......... 455/450 |

FOREIGN PATENT DOCUMENTS

| EP | 2 160 044 | 3/2010 |
| EP | 2 180 730 | 4/2010 |
| JP | 2009-049538 | 3/2009 |
| WO | WO 2008/153081 | 12/2008 |

OTHER PUBLICATIONS

3GPP TS 25.213 V8.4.0 (Mar. 2009); 3rd Generation Partnership Project; Technical Specification Group Radio Access Network; Spreading and modulation (FDD); Release 8.
3GPP TS 25.433 V8.5.0 (Jun. 2009); 3rd Generation Partnership Project; Technical Specification Group Radio Access Network; UTRAN Iub interface Node B Application Part (NBAP) signalling; Release 8.
3GPP TS 25.211 V8.4.0 (Mar. 2009); 3rd Generation Partnership Project; Technical Specification Group Radio Access Network; Physical channels and mapping of transport channels onto physical channels (FDD); Release 8.

(Continued)

*Primary Examiner* — Alvin Zhu
(74) *Attorney, Agent, or Firm* — Nixon & Vanderhye P.C.

(57) ABSTRACT

Random access coverage is assured while at the same time supporting high uplink data rates in a same service area served by a base station. A set of radio resources are shared by multiple mobile terminals for transmitting uplink to the base station including requests for access to service from the base station and transmissions for active connections with the base station. A first repeating time period and a second different repeating time period are defined. Uplink transmission grants are scheduled for active connections that permit use of a greater amount of the radio resources during the first repeating time period. Uplink transmission grants are also scheduled for active connections that permit use of a smaller amount of those resources during the second repeating time period. At least some random access requests to the base station are controlled to occur only during the second repeating time period.

36 Claims, 14 Drawing Sheets

(56) References Cited

OTHER PUBLICATIONS

3GPP TS 25.214 V8.6.0 (May 2009); 3$^{rd}$ Generation Partnership Project; Technical Specification Group Radio Access Network; Physical layer procedures (FDD); Release 8.

3GPP TS 25.331 V8.7.0 (Jun. 2009); 3$^{rd}$ Generation Partnership Project; Technical Specification Group Radio Access Network; Radio Resource Control (RRC); Protocol Specification; Release 8.

Frederik Gunnarsson et al.; U.S. Appl. No. 11/730,575, filed Apr. 2, 2007.

Japanese Office Action with English summary mailed Mar. 10, 2014 in Japanese Application No. 2012-530842.

* cited by examiner

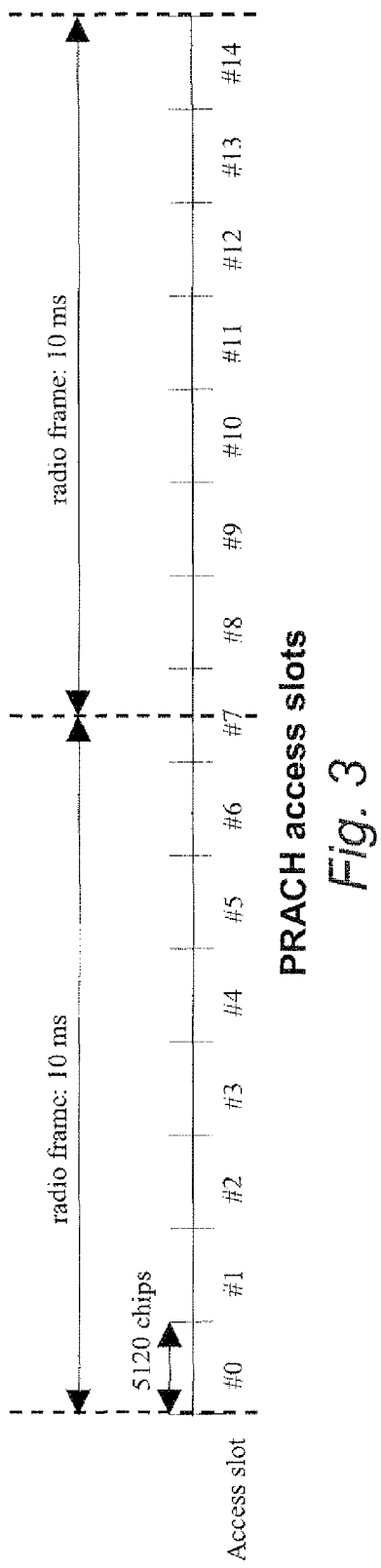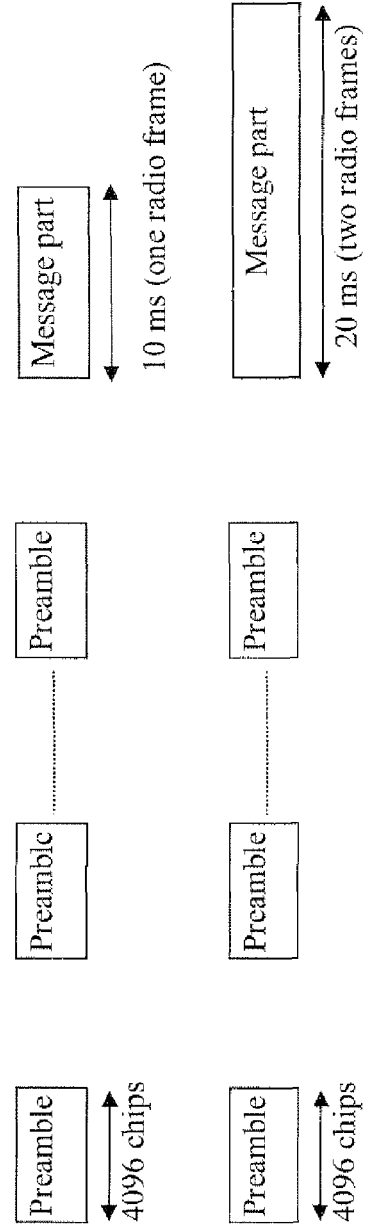

M parallel HARQ processor in case of M=8.

TDM scheme where two users that share the resource are separated in time.

Different RoT aligned with the HARQ processes.

Fig. 11 Example with aligned HARQ process numbers.

Fig. 12 Example without aligned HARQ process numbers.

FHARQ process numbers and RACH uplink access slots separated per sub-channel for the case when AICH_Transmission_Timing is 0.

Case with low RoT in one HARQ process corresponding to sub-channel #0.

Case with low RoT in two HARQ processes corresponding to sub-channels #0-2.

Case with low RoT in four HARQ processes corresponding to sub-channels #0-5.

RANDOM ACCESS WITH FULL COVERAGE ON SELECTED RESOURCES

TECHNICAL FIELD

The technical field relates to mobile radio communications, and in particular, to uplink communications involving mobile radio terminals in a mobile radio communications system.

BACKGROUND

Universal Mobile Telecommunications System (UMTS) is a 3rd Generation (3G) asynchronous mobile communication system operating in Wideband Code Division. Multiple Access (WCDMA) based on European systems, Global System for Mobile communications (GSM) and General Packet Radio Services (GPRS). In the 3GPP release 99, the radio network controller (RNC) controls resources and user mobility. Resource control includes admission control, congestion control, and channel switching which corresponds to changing the data rate of a connection. A dedicated radio connection is carried over a dedicated channel DCH, which is realized as a DPCCH (Dedicated Physical Control Channel) and a DPDCH (Dedicated Physical Data Channel).

The Long Term Evolution (LIE) of UMTS is under discussion by the 3rd Generation Partnership Project (3GPP) which standardized UMTS. The objective of the LTE work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

A mobile radio terminal, often referred to as a user equipment (UE), in an idle state monitors system information broadcast by base stations within range to inform itself about "candidate" base stations in the service area. When a mobile terminal needs access to services from a UMTS radio access network, it sends a request over a random access channel (RACH) via a suitable base station, typically a base station with the most favorable radio conditions. Because the uplink propagation conditions are usually only approximately known, the mobile terminal gradually increases its transmission power over the RACH until either the base station acknowledges the message or a predetermined number of unsuccessful access attempts has been reached. But assuming the mobile terminal is admitted access, a radio communications connection or link via the most suitable base station is initiated towards the mobile terminal if there are available radio resources. Uplink coverage by the base station is thus a necessity for successful random access.

There is a trade-off between uplink coverage and uplink-enabled peak transmission rates over the radio interface. This trade-off is even more pronounced in systems that provide enhanced uplink communications supporting higher uplink data rates than typical dedicated channels. The uplink radio resources in a cell coverage areas are limited by the rise over thermal (RoT) that the cell can tolerate. The RoT is the total received power at the base station divided by the thermal noise in the cell, and the cell coverage is limited by a maximum RoT. The maximum RoT is either determined based on coverage requirements and/or uplink power control stability requirements. When only one UE is transmitting over an uplink connection in the cell, both power control stability and coverage are minor issues because the uplink interference is likely to be dominated by the power generated by this UE. In this situation, a higher maximum RoT may be used to allow a higher signal-to-interference ratio Ec/Io, which enables higher uplink bit rates. But in order to use the higher uplink bit rates, the UE connections have to provide high Ec/Io, which implies high RoT.

Cells operating at high RoT unfortunately have limited coverage. Higher RoTs may make it difficult or even impossible for mobile terminals to successfully complete random access from some parts of the cell service area. The RACH preamble may not be detected at these high RoT when sent from certain parts of the service area. Furthermore, the gradual power increase by mobile terminals requesting access may generate significant interference in the cell, which decreases the signal-to-interference ratio Ec/Io, which negatively impacts the uplink mobile terminal data rates. Without regulation, mobile terminals may even request higher uplink data rates and be permitted to transmit at higher uplink data rates even though they may not be capable of or will even benefit from being permitted to transmit at higher uplink data rates.

Neither is it practical to lower the RACH preamble threshold because this will lead to many erroneous preamble detections caused only by thermal noise. In many cases, a lower RACH preamble threshold also results in legitimate RACH transmissions at too low power levels, which will not be decoded correctly, and thus, must be retransmitted. Moreover, the short time between a received preamble and when a RACH acquisition indicator is expected means there is very limited time for processing before it must be determined whether a preamble was sent at a sufficient power level.

SUMMARY

Random access coverage is assured while at the same time supporting high uplink data rates in a same service area served by a base station. A set of radio resources are shared by multiple mobile terminals for transmitting uplink to the base station including requests for access to service from the base station and transmissions for active connections with the base station. A first repeating time period and a second different repeating time period are defined. Uplink transmission grants are scheduled for active connections that permit use of a greater amount of the radio resources during the first repeating time period. Uplink transmission grants are also scheduled for active connections that permit use of a smaller amount of those resources during the second repeating time period. At least some random access requests to the base station are controlled to occur only during the second repeating time period.

The base station provides greater coverage during the second repeating time period than during the first repeating time period. In addition to the greater coverage, the base station can also schedule uplink transmission grants for one or more active connections at higher data rates during the first repeating time period than for the second repeating time period.

In one example implementation, all random access requests to the base station are controlled to occur only during the second repeating time period. For example, the base station can advertise only uplink time transmission intervals (TTIs) during the second repeating time period as allowed for mobile radio terminal random access to the base station. In another example implementation, other random access requests to the base station may occur during the first repeating time period.

An uplink rise over thermal (RoT) target value or an uplink load target value associated with the base station coverage area may be provided. The second repeating time period corresponds to a lower uplink rise over thermal (RoT) target value or a lower uplink load target value associated with the base station coverage area than during the first repeating time period. Changes in the RoT target value or the uplink load target value may be aligned with uplink transmission time intervals, hybrid ARQ (HARQ) processes associated with active mobile radio terminals, and/or an acquisition indication channel (AICH) used by the base station to acknowledge random access requests to the base station. In the latter, the AICH is aligned with clock reference signal for the base station or a system frame number reference.

In one example embodiment, the random access requests to the base station are made over a random access channel (RACH) that includes multiple RACH sub-channels. A RACH sub-channel defines a sub-set of a total set of uplink RACH access slots. Specific ones of the RACH sub-channels are aligned with the second repeating time period.

One or more load control factors associated with the base station may be determined. A decision is made whether to schedule an active mobile terminal uplink transmission during the first repeating time period or the second repeating time period based on the one or more load control factors. The one or more load control factors include one or more of the following: a number of mobile terminals that need to be scheduled for uplink transmission, buffer status, uplink transmit power headroom, mobile radio terminal type, category, or capability, subscription associated with a mobile radio terminal, a service requested by a mobile radio terminal, and a current radio condition.

If desired, one or both of the first repeating time period or the second repeating time period may be adjusted.

The functions and procedures outlined above may be implemented in the base station. A mobile radio terminal is also provided configured for use with such a base station.

Another way of expressing this technology is that the base station implements a time division multiplexing (TDM)-based uplink scheduling scheme that takes into account different uplink load targets for different transmission time slots. A relationship is defined between uplink time slot alignment and random access uplink slot alignment that relates the uplink time slots with load uplink load targets to random access uplink slots. As explained above, the base station may, if desired, only advertise the random access uplink slots corresponding to low uplink load targets as allowed for random access by mobile terminals. Allowed mobile terminals may be further restricted by specific mobile terminal access service classes, terminal types, subscriptions, services, etc. If desired, there may be times with all time periods are enabled for random access relying on probability that the accessing mobile terminals will eventually succeed.

BRIEF DESCRIPTION OF THE DRAWINGS

FIG. 3 illustrates example RACH access slots;

FIG. 4 illustrates an example RACH transmission structure;

FIG. 11 illustrates an example of aligned the HARQ processes;

FIG. 12 illustrates an example of without aligned the HARQ processes;

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs).

It will be apparent to one skilled in the art that other embodiments may be practiced apart from the specific details disclosed below. The technology is described in the context of a 3GPP UMTS system in order to provide an example and non-limiting context for explanation. But this technology may be used in any modern cellular communications system.

Figure 1:
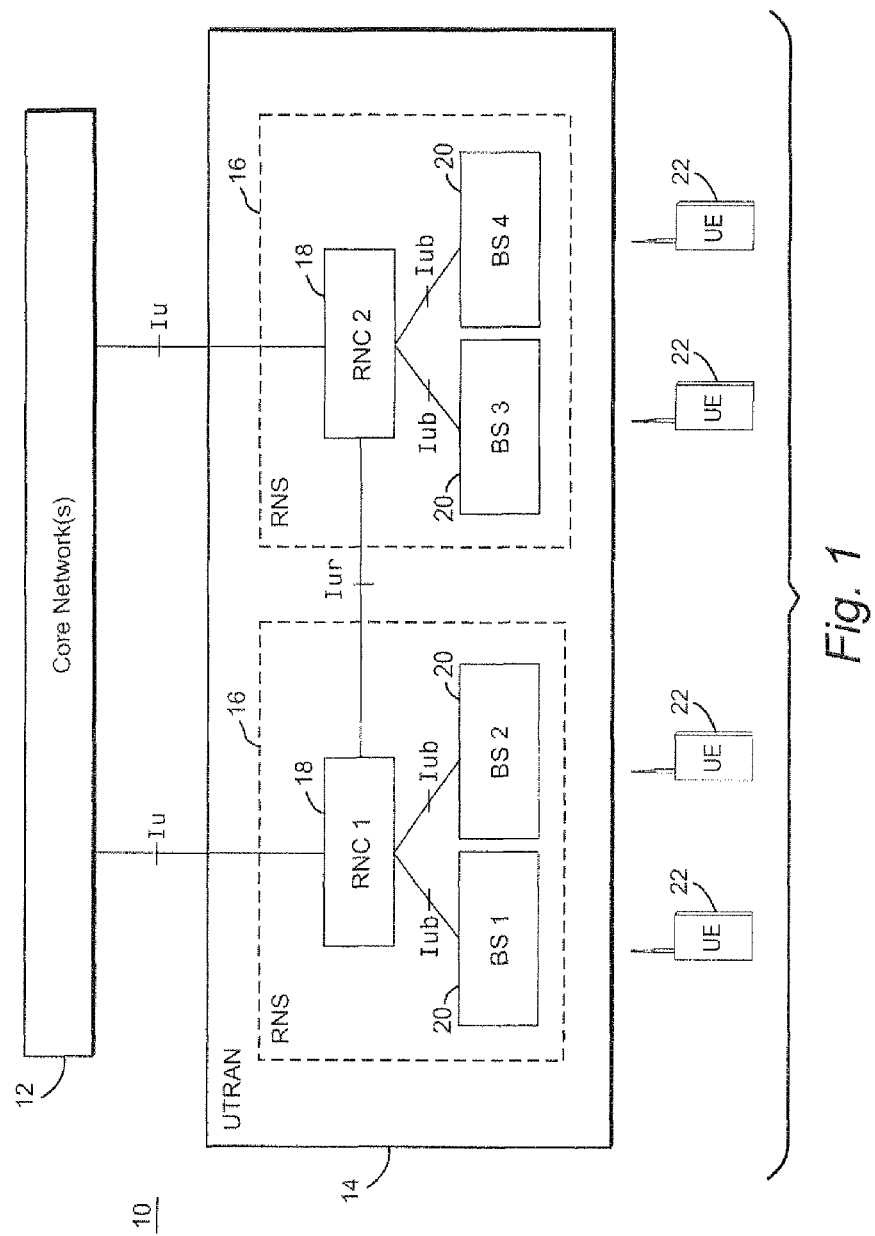
FIG. 1 a block diagram of an example UTRAN mobile radio communications system.

FIG. 1 illustrates a non-limiting example of a third generation, WCDMA-based cellular radio communication system 10. The User Equipment (UE) 22 is the mobile radio terminal by which a user/subscriber can access services offered by the operator's Core Network(s) 12. Those networks are coupled to other networks such as the public switched telephone network (PSTN) and the Internet (not shown). The UMTS Terrestrial Radio Access Network (UTRAN) 14 is responsible for the establishment and control of radio connections with the mobile UEs. The Radio Network Subsystem (RNS) 16 controls a number of Base Stations (BSs) 20 in the UTRAN 14. Each base station 20 coordinates radio communications in one or more cells. A cell covers a geographical area and is identified by a unique identity broadcast in the cell by its base station. There may be more than one cell covering the same geographical area, and in this case, two of the base station cells may be co-sited. Each Radio Network Controller (RNC) 18 controls radio resources and radio connectivity within a set of cells.

FIG. 1 shows interfaces connecting the different nodes in the UTRAN 14. The Iu interface is defined between the core network 12 and the UTRAN 14. The Iur interface is defined for communications between RNCs 18. The Iub interface is defined for communications between the RNC 18 and its base stations 20. User data is transported on transport bearers over these interfaces. Depending on the transport network used, these transport bearers may be mapped to AAL2 connections (in case of an ATM-based transport network) or UDP connections (in case of an IP-based transport network).

Figure 2:
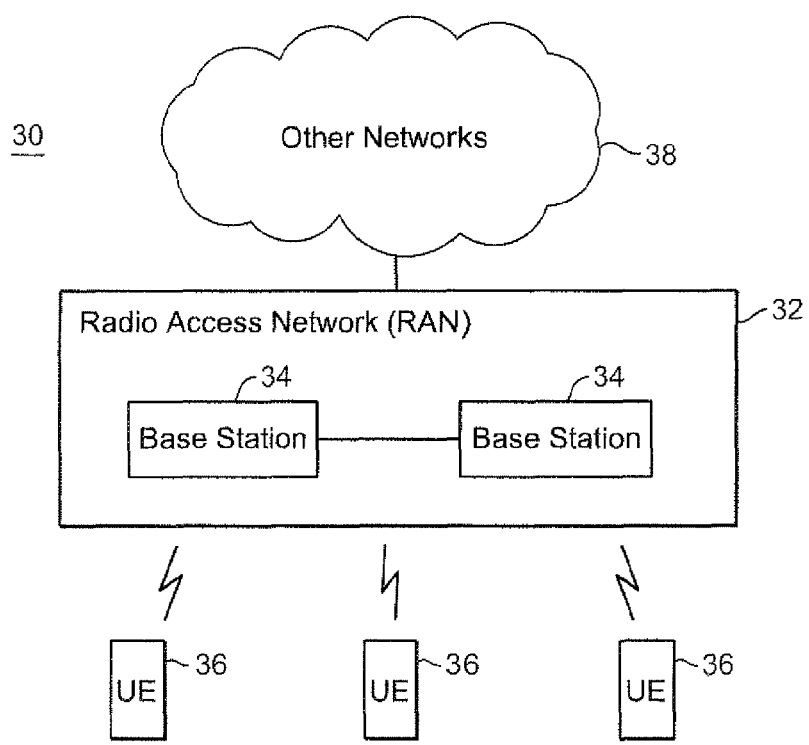
FIG. 2 is a block diagram of an example LTE mobile radio communications system.

FIG. 2 illustrates an LTE mobile communication system 30. A radio access network (RAN) 32 is coupled to one or more other networks 38 such as one or more core network nodes and one or more external networks such as the public switched telephone network (PSTN) and the Internet. The RAN 32 includes base stations 34 that communicate with each other, e.g., for handover and other coordinated functions. The base stations communicate over the radio/air interface with mobile radio terminals also referred to as user equipment (UE) 36. At least some of the operations that would be performed in the RNC in the UMTS system 10 shown in FIG. 1 are performed in the base stations in the LTE system 30.

The following detailed description uses a non-limiting example context of a 3GPP release 99 UTRAN for illustration purposes only. Random access in UTRAN is based upon slotted-ALOHA. A UE in idle state monitors the system information broadcast by a base station within range to inform itself about candidate base stations in the service area. When a UE needs access to services, it sends a request over a random access channel (RACH) to the most suitable base station, typically the one with the most favorable radio conditions. Since the uplink propagation is only approximately known, the UE gradually increases the transmission power of a known RACH preamble until either it has been acknowledged via an Acquisition Indication channel (AICH) or a maximum number of attempts is reached. Upon acknowledgement via the AICH, the UE sends a RACH message at the appropriate time. After admission control, the connection via the most suitable base station is established if there are available resources. Uplink coverage is a necessity in order to successfully complete random access.

The UE can start random access transmission at the beginning of a number of well-defined time intervals denoted access slots. FIG. 3 illustrates example RACH access slots. Information on which access slots are available for random access transmission is provided by higher layers.

FIG. 4 illustrates an example RACH transmission structure for WCDMA. The random access transmission in this non-limiting example includes one or several preambles of length 4096 chips and a message of length 10 ms or 20 ms. Each preamble is of length 4096 chips and includes 256 repetitions of a signature of length 16 chips. There are a maximum of 16 available signatures.

An overview of an example RACH procedure is now provided. Before the physical random-access procedure can be initiated, the physical layer 1 receives the following information from higher layers (e.g., RRC): a preamble scrambling code, a message length in time, either 10 or 20 ms, a AICH_Transmission_Timing parameter [0 or 1], a set of available signatures and a set of available RACH sub-channels for each Access Service Class (ASC), a power-ramping factor Power Ramp Step [integer >0], a parameter Preamble Retrans Max [integer >0], an initial preamble power Preamble_Initial_Power, the Power offset P p-m=Pmessage-control−Ppreamble, measured in dB, between the power of the last transmitted preamble and the control part of the random-access message, and a set of Transport Format parameters.

The physical random-access procedure may be performed using the following steps (excluding signaling to higher layers): 1-derive the available uplink access slots; 2-randomly select a signature from the set of available signatures within the given ASC; 3-set the Preamble Retransmission Counter to Preamble Retrans Max.; 4-calculate initial preamble power, considering the limited UE power; 5-transmit a preamble using the selected uplink access slot, signature, and preamble transmission power, and 6-if no positive or negative acquisition indicator (AI≠+1 nor −1) corresponding to the selected signature is detected in the downlink access slot corresponding to the selected uplink access slot: 6.1-select the next available access slot in the set of available RACH sub-channels within the given ASC; 6-2 randomly select a new signature from the set of available signatures within the given ASC; 6-3 increase preamble power by ΔP0=Power Ramp Step [dB]; 6-4 decrease the Preamble Retransmission Counter by one; 6-5 if the Preamble Retransmission Counter >0, then repeat from step 5, but otherwise exit the physical random access procedure; 6-6 if a negative acquisition indicator is detected, then exit the physical random access procedure; and 7-transmit the random access message three or four uplink access slots after the uplink access slot of the last transmitted preamble depending on the AICH transmission timing parameter. Transmission control part power should be P p-m [dB] higher than the power of the last transmitted preamble.

The preamble detection mechanism in the base station is based on received preamble correlation or received energy relative to a preconfigured preamble threshold. A too-low threshold may mistakenly trigger preambles from thermal noise, and a too-high threshold may trigger preambles at very high power levels or miss preambles all together. The threshold may be set considering the worst case uplink load situation.

A RACH sub-channel defines a sub-set of the total set of uplink access slots. In the non-limiting example, there are a total of 12 RACH sub-channels, essentially using one twelfth of the uplink slots each. Table 1 illustrates the access slots associated with the different sub-channels. The set of allowed sub-channels may for example be signaled from higher layers depending on the UE access service class.

TABLE 1

The available uplink access slots for different RACH sub-channels

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | | 8 | 9 | 10 | 11 | 12 | 13 | 14 | | |
| 6 | 3 | 4 | 5 | 6 | 7 | | | | | 0 | 1 | 2 |
| 7 | | | | | | 8 | 9 | 10 | 11 | 12 | 13 | 14 |

The downlink AICH is divided into downlink access slots, and each access slot is of length 5120 chips. AICH access slots #0 starts the same time as P-CCPCH frames with (SFN modulo 2)=0. Similarly, the uplink PRACH is divided into uplink access slots, each access slot is of length 5120 chips.

Figure 5:
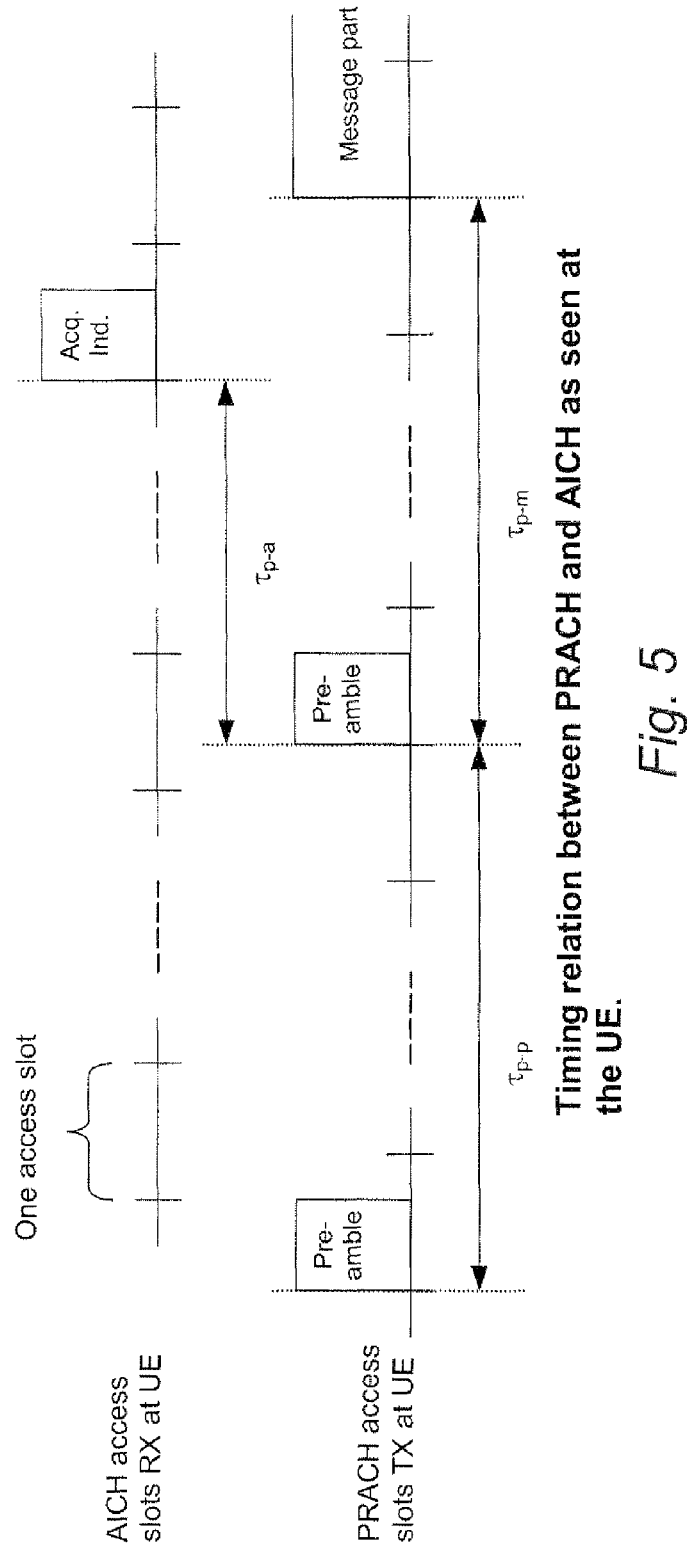
FIG. 5 illustrates an example timing relation between RACH and AICH as seen at the UE.

Uplink access slot number n is transmitted from the UE $\tau_{p-a}$ chips prior to the reception of downlink access slot number n, n=0, 1, . . . , 14. Transmission of downlink acquisition indicators in this example may only start at the beginning of a downlink access slot. Similarly, transmission of uplink RACH preambles and RACH message parts in this example may only start at the beginning of an uplink access slot. FIG. 5 illustrates an example timing relation between RACH and AICH as seen at the UE.

The preamble-to-preamble distance $\tau_{p-p}$ shall be larger than or equal to the minimum preamble-to-preamble distance $\tau_{p-p,min}$, i.e., $\tau_{p-p} \geq \tau_{p-p,min}$. In addition to $\tau_{p-p,min}$, the preamble-to-AI distance $\tau_{p-a}$ and preamble-to-message distance $\tau_{p-m}$ are defined as follows:

when AICH_Transmission_Timing is set to 0, then
  $\tau_{p-p,min}$=15360 chips (3 access slots)
  $\tau_{p-a}$=7680 chips (1.5 access slots)
  $\tau_{p-m}$=15360 chips (3 access slots)
when AICH_Transmission_Timing is set to 1, then
  $\tau_{p-p,min}$=20480 chips (4 access slots)
  $\tau_{p-a}$=12800 chips (2 access slots)
  $\tau_{p-m}$=20480 chips (4 access slots).

The parameter AICH_Transmission_Timing may be signaled by higher layers.

Figure 6:
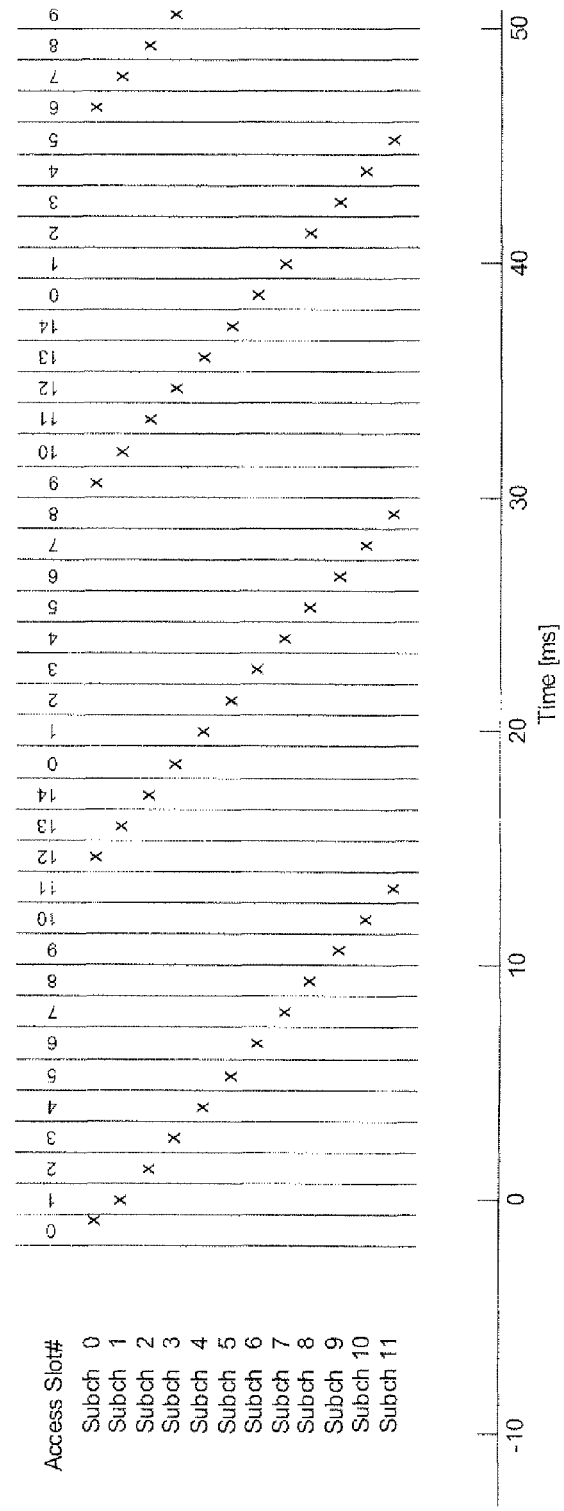
FIG. 6 illustrates an example of available preambles for the first RACH preamble transmission relative the time of downlink access slot #0.

FIG. 6 illustrates an example of available preambles for the first RACH preamble transmission relative the time of downlink access slot #0. The figure plots RACH access slots per sub-channel available for the first RACH preamble transmission versus time. The primary common control physical channel (P-CCPCH) system frame number (SFN) module 8=0 is the base station time reference represented as 0 on the x-axis.

If the initial preamble transmission is not acknowledged over AICH, the UE selects a new access slot among the access slots associated to the allowed sub-channels, considering that the next preamble is at least either 3 or 4 access slots later, depending on the AICH_Transmission_Timing parameter. For example, if the UE is allowed to use sub-channels 0-3, and $\tau_{p-p,min}$ corresponds to 3 access slots, then if the UE selected access slot #0 for the first preamble transmission, a possible preamble retransmission can take place in access slot #3. But if the UE selected access slot #1 for the first preamble transmission, then a possible preamble retransmission can take place in access slot #12 at earliest.

Regarding uplink radio resource management in this non-limiting 3GPP example illustration, in 3GPP release 99, the RNC controls resources and user mobility. Resource control in this framework means admission control, congestion control, and channel switching (roughly changing the data rate of a connection). Furthermore, a dedicated connection is carried over a dedicated channel DCH, which is realized as a DPCCH (Dedicated Physical Control Channel) and a DPDCH (Dedicated Physical Data Channel).

In the evolved 3G standards, the trend is to decentralize decision making, and in particular, the control over the short term data rate of the user connection. The uplink data is then allocated to E-DCH which is realized as the triplet: a DPCCH, which is continuous, a E-DPCCH for data control and a E-DPDCH for data. The latter two are only transmitted when there is uplink data to send. Hence, the base station uplink scheduler determines which transport formats each user can use over E-DPDCH. The RNC is still responsible for admission control. For brief data sessions, user connections may continue using the random access channel for data communication after a completed random access procedure. High data rates are also available with the recent enhanced RACH additions, enabling similar data transmission formats over the RACH as over the E-DCH.

Figure 7:
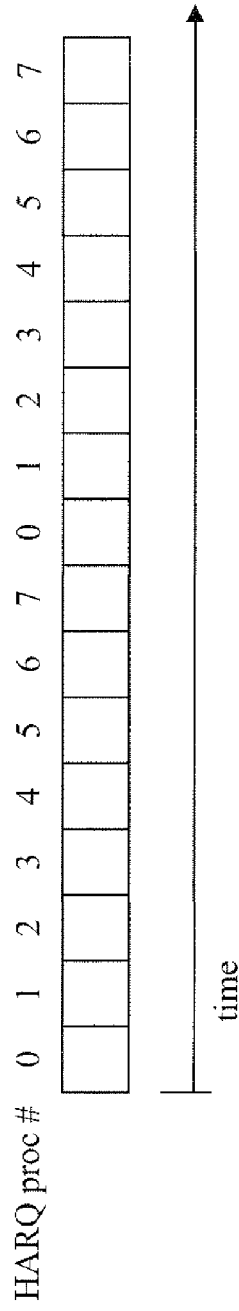
FIG. 7 depicts parallel HARQ processors for M=8.

A data block is sent uplink by the UE to the base station during a transmission time interval (TTI). For efficiency, the received data blocks at the receiver are processed in parallel at M parallel processors taking turn to process data. While data block i is processed and decoding information is fed back to the transmitter, the receiver starts processing data blocks i, i+1, . . . , etc. By the time the receiver processor 0 has decoded the data block and fed back the decoding result, it is ready for processing either a retransmission of information related to the recently processed data or a new data block. By combining information both from the original data block and the retransmission, it is possible to correct errors in the reception. A retransmission scheme with both error correction and error detection is referred to hybrid ARQ (HARQ). Therefore, the M processors are often referred to as HARQ processes, each handling a data block received in a TTI. FIG. 7 depicts parallel HARQ processors for M=8.

In the WCDMA uplink, there is a trade-off between coverage and enabled peak rates. This trade-off is further emphasized with enhanced uplink, which supports higher bit rates than ordinary dedicated channels. The uplink resources are limited by the rise over thermal (RoT) that the cell can tolerate. The RoT limit is either motivated by coverage requirements or power control stability requirements. When only one user's UE is connected in the cell, both power control stability and coverage are minor issues because the uplink interference is likely to be dominated by the power generated by this UE. In such a case, it is tempting to allow a high RoT in order to allow high received signal relative interference, Ec/Io, which enables the use of high uplink bit rates. Conversely, in order to use the high uplink bit rates, the user connections have to provide high Ec/Io, which implies high RoT.

Figure 8:
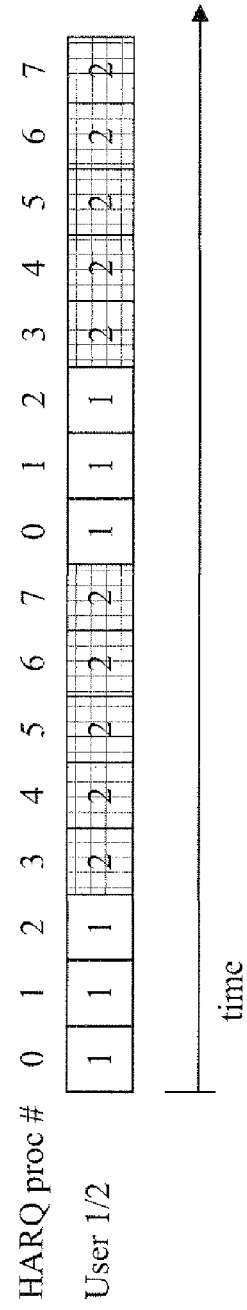
FIG. 8 shows an example TDM scheme where two users that share the resource are separated in time.

To better avoid interference between users in the same cell, the technology separates user data transmissions in time using a TDM (time division multiplex) scheme. The technology takes advantage of the ability to grant uplink transmission times for active UEs that are only valid for specified HARQ processes. The latter also allows retransmissions without interfering with other UEs because retransmissions use the same HARQ process as the original transmission. As a simple illustration, FIG. 8 shows an example TDM scheme where two UEs sharing the radio resource are separated in time.

As explained in the background, cells operating at high RoT provide only limited coverage which makes it difficult or even impossible for mobile terminals to successfully complete random access from some parts of the cell service area. A RACH preamble may not be detected by the base station when sent from those parts of the service area. Lowering the RACH preamble detection threshold leads to many erroneous preamble detections many of which may simply be from only thermal noise resulting in unnecessary transmissions of subsequent RACH messages. Moreover, the short time between a received preamble and when a RACH acquisition indicator is expected means there is very limited time for processing before it must be determined whether a preamble was correctly sent at a sufficient power level.

Figure 9:
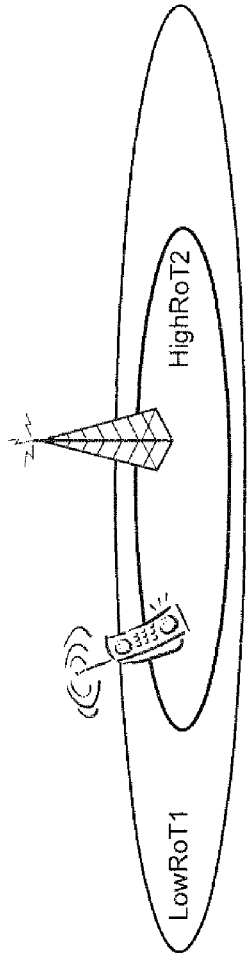
FIG. 9 illustrates an example of uplink coverage for two different levels of RoT.

The technology in this application exploits TDM so that shared uplink radio resources are granted taking into account different levels of rise over thermal (RoT) or uplink load in the cell. Random access performance improves during low levels of rise over thermal or low uplink load and deteriorates for high levels of rise over thermal or high uplink load. FIG. 9 illustrates an example of uplink coverage for two different levels of RoT.

Figure 10:
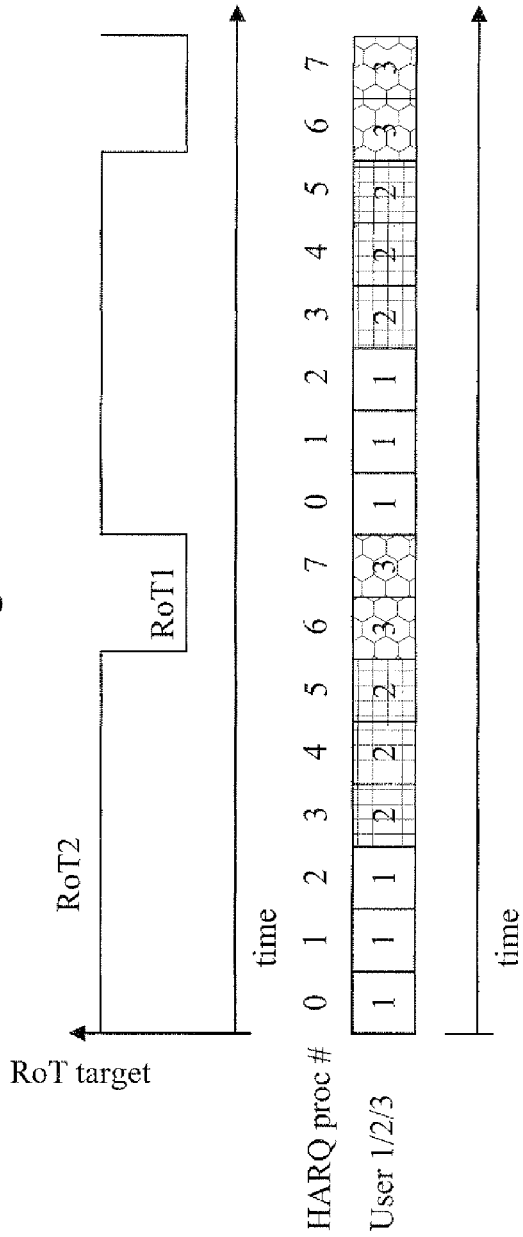
FIG. 10 illustrates an example of different RoTs aligned with the HARQ processes.

The upper part of FIG. 10 illustrates an example of a changing RoT target/base station uplink load. The lower part of FIG. 10 shows how example HARQ processes divided in time (TDM) for three active UEs, i.e., UEs to be scheduled for uplink transmissions, are aligned with the acquisition channel AICH with acceptable accuracy. Users 1 and 2 are scheduled in TTIs 0-2 and 3-5, respectively, to permit high uplink data rate transmission. User 3 is scheduled in TTIs 6-7 for low uplink data rate transmission and thus low RotT. Significantly, the low RoT time period is purposefully aligned with specific RACH sub-channels corresponding to TTIs 6-7. As a result and in general, the allowed RACH sub-channels for requesting UEs may be advantageously restricted to only those with better RACH coverage and lower RoT. Moreover, the better RACH coverage can be assigned to specific access service classes by associating the RACH sub-channels in this way.

Alignment of UE uplink transmissions need not be exact, but it may be desirable to align with sufficient accuracy the transmission time intervals (TTIs) for the UEs with the HARQ process numbers as shown in the example in FIG. 11. But this is not a necessity. The base station need only keep track of the HARQ process numbers relative some absolute time reference such as any frame number counter like CFN, SFN, etc. As a result, the situation shown in FIG. 12 without aligned the HARQ processes is also possible. For explanation purposes only, the HARQ process numbers are treated below as aligned between the UEs. In both FIGS. 11 and 12, a check symbol is used to indicate transmission during a TTI and a dash symbol to indicate no transmission. As shown in FIGS. 11 and 12, users 1 and 2 only transmit in TTI's during the higher RoT2 following the example set out in FIG. 10.

When determining the grant for a UE valid for a specific HARQ process, a scheduler in the base station considers a RoT target value for the specific HARQ process. The HARQ process-specific RoT target value may be predetermined, and/or it may be adapted over time. This adaptation is managed by a controller in the base station that determines HARQ process-specific RoT targets. In one non-limiting example, two RoT target levels (high and low) are predetermined, and the controller adjusts how many HARQ processes will use a low RoT target level while the rest will use a high RoT target level. In another non-limiting example, the RoT target levels are also adapted, e.g., the low RoT target may be adapted based on random access performance statistics. The adaptation may depend on UE need, request, class, status, etc. The number of HARQ processes with a low RoT target value relates to the access success probability of the UEs.

Figure 13:
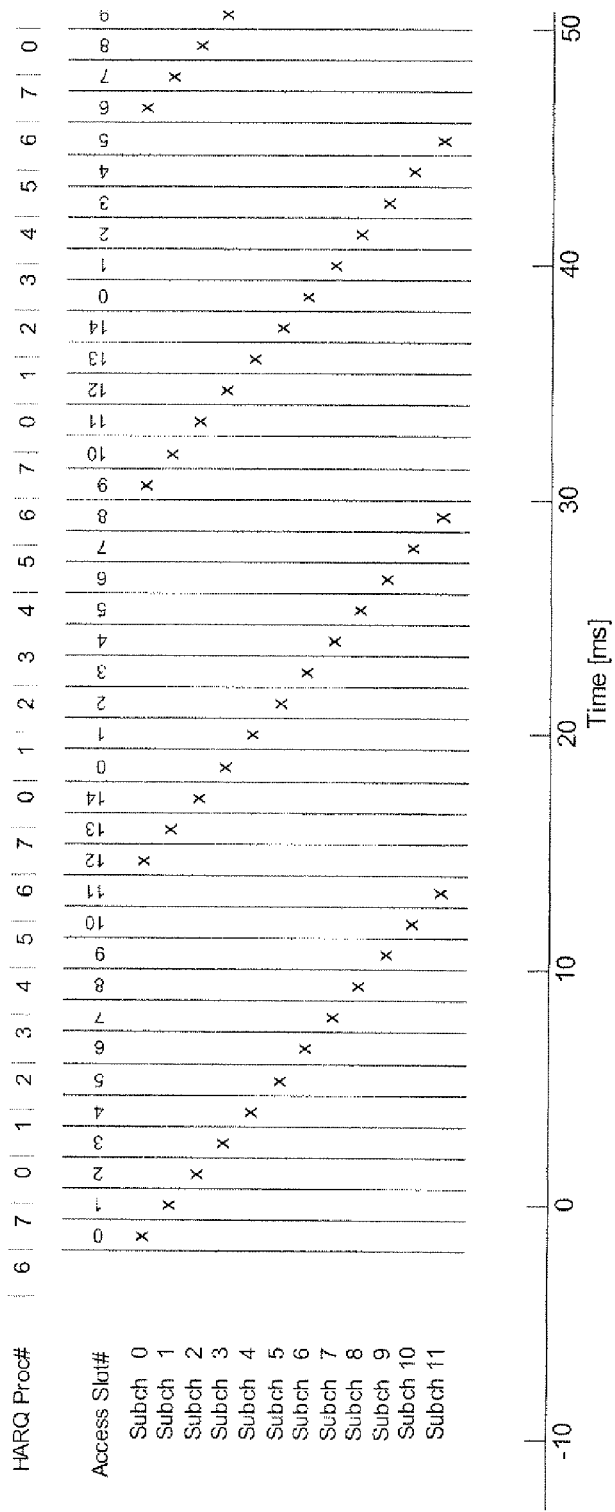
FIG. 13 illustrates an example relationship between HARQ process numbers and RACH uplink access slots separated per sub-channel for the case when AICH_Transmission_Timing is 0.

As one example implementation, the HARQ Processes may be aligned with the acquisition channel (AICH) and/or the RACH sub-channels such as those described above and illustrated in FIGS. 3-6. The timing of the uplink RACH access slots are defined relative the timing of the AICH. Given the AICH_Transmission_Timing, the uplink RACH access slots can be analyzed relative the HARQ process numbers, and in turn, to the RoT target levels. Uplink RACH access slots with better coverage than others are then identified. FIG. 13 illustrates an example relationship between HARQ process numbers and RACH uplink access slots separated per sub-channel for the case when AICH_Transmission_Timing is 0.

Figure 14:
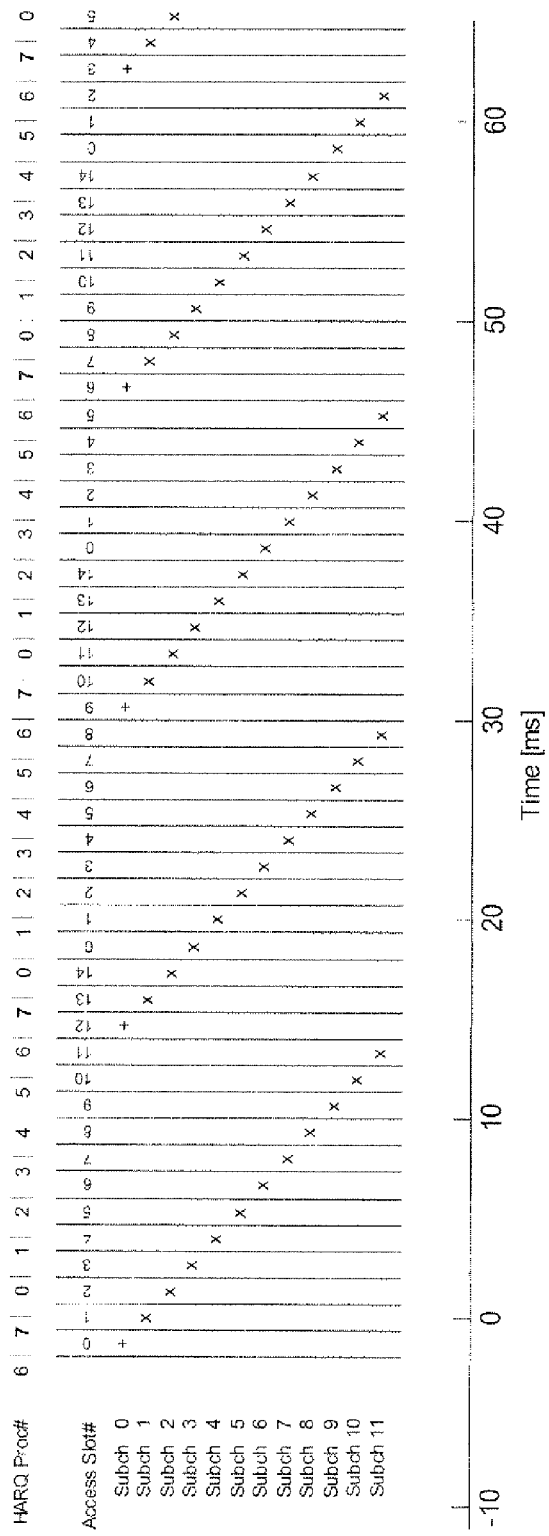
FIG. 14 uses the illustration in FIG. 13 for a situation where there is low RoT in one HARQ process which corresponds to good coverage for sub-channel #0.
Figure 15:
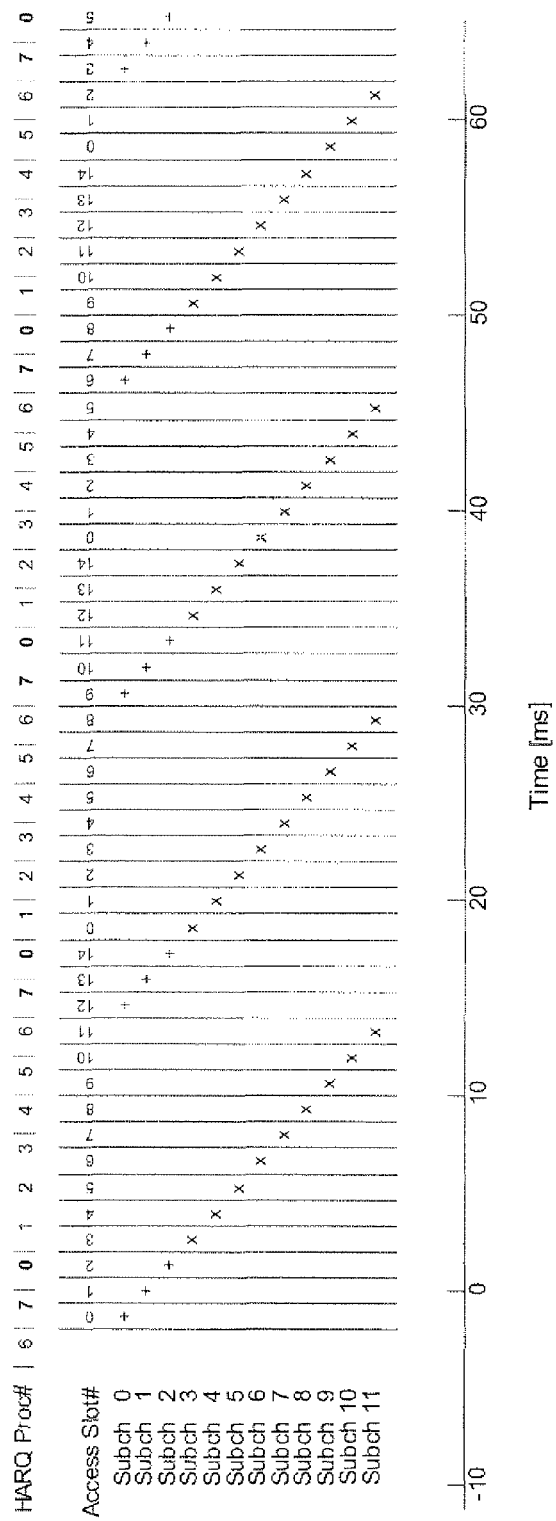
FIG. 15 uses the illustration in FIG. 13 for a situation where there is low RoT in two HARQ processes which corresponds to good coverage for sub-channels #0-2.
Figure 16:
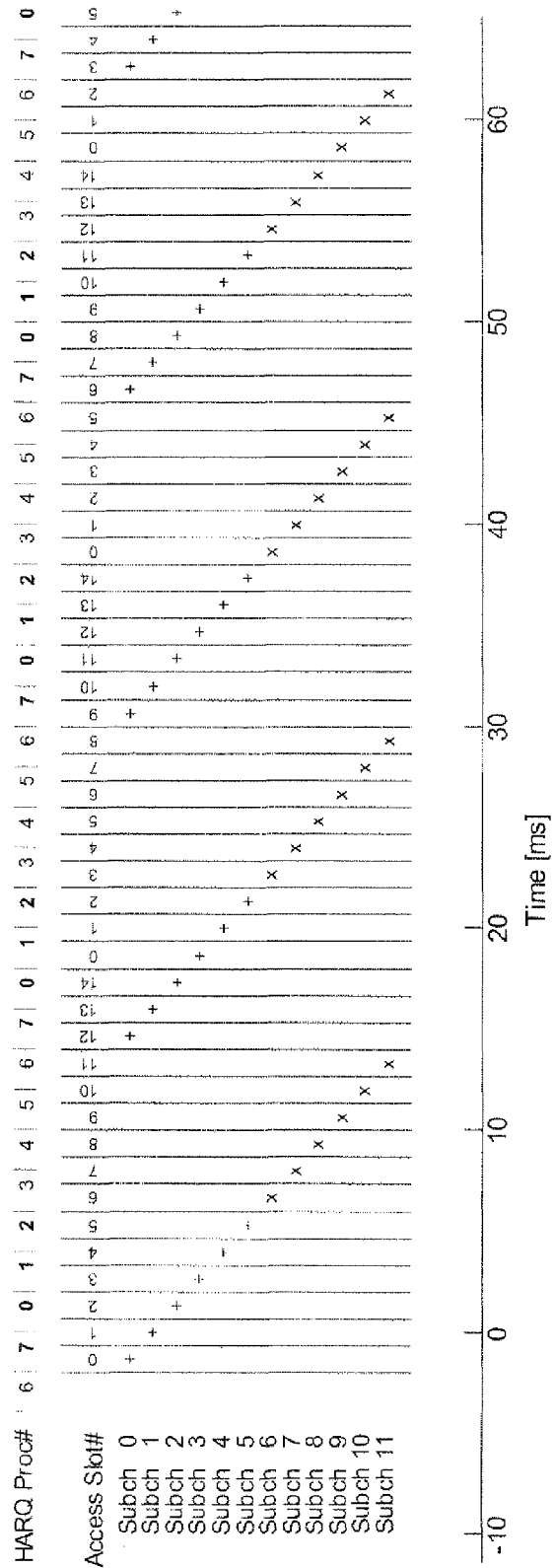
FIG. 16 uses the illustration in FIG. 13 for a situation where there is low RoT in four HARQ processes which corresponds to good coverage for sub-channels #0-5.

By relating the HARQ processes with a low RoT to corresponding RACH uplink access slots, RACH sub-channels with better coverage than other RACH sub-channels may be determined. Based on the illustration in FIG. 13, FIG. 14 illustrates a situation where there is low RoT in one HARQ process which corresponds to good coverage for RACH sub-channel #0. FIG. 15 shows an example where there is low RoT in two HARQ processes which corresponds to good coverage for RACH sub-channels #0-2. FIG. 16 shows an example when there is low RoT in four HARQ processes which corresponds to good coverage for RACH sub-channels #0-5. The HARQ processes have a cycle of M (in the example used here, M=8 for enhanced uplink with a 2 ms TTI), and there are 12 subchannels. If $M_{low}$ HARQ processes ($M_{low} \leq M$) use a low RoT target level, this corresponds to $M_{low}*12/8$ RACH subchannels with good coverage, if the alignment is adequate. If the alignment is less adequate, then fractions of the time slots for certain subchannels will be subject to higher levels of interference.

The number of HARQ processes with a low RoT target is a trade-off between a need to offer high bit rates for HARQ processes with high RoT targets and the expected random access load. Having fewer RACH sub-channels increases the risk of collisions between accessing UEs trying to access service from the base station, which degrades the overall RACH access success probability.

Figure 17:
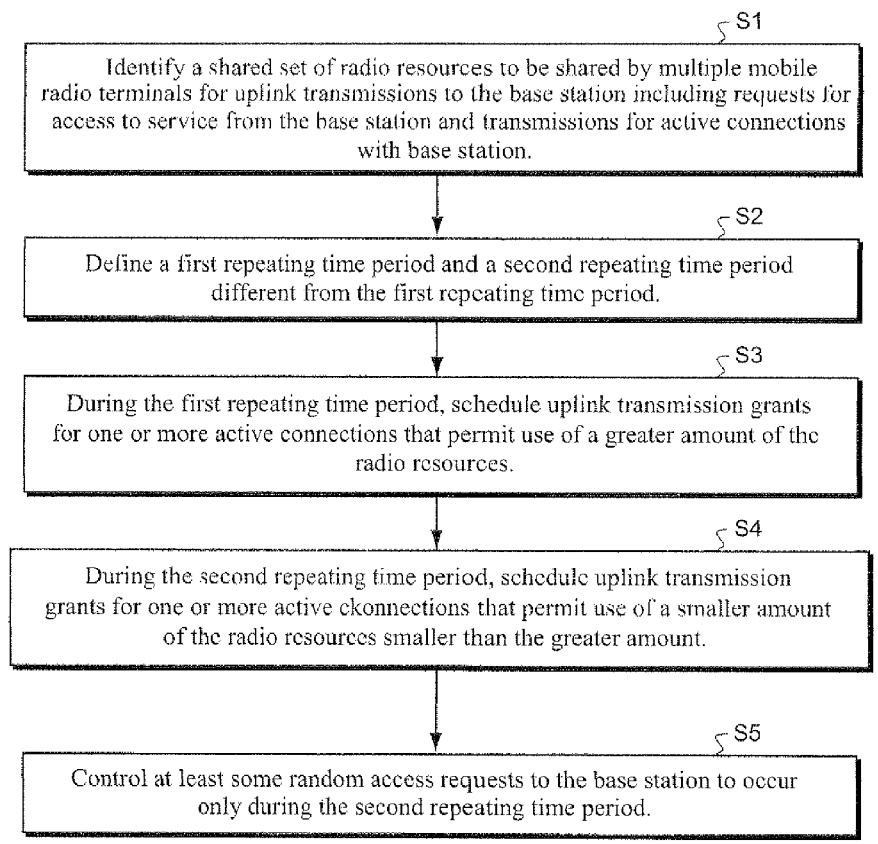
FIG. 17 is a flowchart showing non-limiting example procedures.

FIG. 17 is a flowchart showing non-limiting example procedures for ensuring random access coverage while supporting high uplink data rates in a same service area served by a base station. A shared set of radio resources to be shared by multiple mobile radio terminals for uplink transmissions to the base station is identified (step S1). The uplink transmissions include requests for access to service from the base station and transmissions for active connections with the base station. A first repeating time period and a second different repeating time period are defined (step S2). During the first repeating time period, scheduling uplink transmission grants for one or more active connections that permit use of a greater amount of the radio resources (step S3). During the second repeating time period, scheduling uplink transmission grants for one or more active connections that permit use of a smaller amount of the radio resources, i.e., smaller than the greater amount (step S4). At least some random access requests to the base station are controlled so that they only occur during the second repeating time period (step S5).

There are many different variations and additions possible for this basic methodology. For example, more (even all) RACH subchannels may be allowed, even though only a subset of those are subject to good coverage. In such a case, the probability of a successful RACH reception depends on the fraction of the allowed RACH subchannels that are subject to good coverage. The fact that some allowed subchannels are subject to good coverage means that the random access probability increases as compared to operating without RACH subchannels subject to good coverage. Consequently, there is no need to align random access with HARQ processes etc.

In another example implementation, the base station advertises as available only the RACH sub-channels with better coverage to the UEs via broadcast information on BCH.

In yet another example, the RACH sub-channels with better coverage are associated to specific access service class(es) thereby providing better RACH coverage to some services/subscriptions/terminal categories etc. Moreover, some RACH sub-channels with better coverage may be associated with enhanced RACH, roughly enabling E-DCH transport formats also over RACH for data transmission.

Another aspect of this technology relates to associated uplink load control by the base station given time-varying RoT targets as described above. A time-varying RoT target means that higher bit rates may be allocated for some HARQ processes than for others. In order to utilize the shared uplink radio resources efficiently, it is beneficial to monitor the extent to which UEs benefit from being allocated to a HARQ process that corresponds to a high RoT target.

In one example embodiment, UEs with certain capabilities, (e.g., belonging to a specific set of UE categories), may be prioritized when deciding which UEs that shall be allocated to the high RoT target HARQ processes. Alternatively, the determination whether a UE benefits from being allocated to one or more high RoT target HARQ processes may be based on the transport format combinations selected by the UE and whether the UE is satisfied according to the "happy bit." For example, if a UE selects transport format combinations lower than a threshold, while indicating satisfaction using the happy bit, then the UE is power-limited to a significant degree. This can be interpreted as an indication that the UE will not benefit from being allocated to the high RoT target HARQ processes where high data rates and high RoT are allowed.

The scheduling information (e.g., buffer status, power headroom, etc.) from the UE may be used when deciding which UEs should be allocated the high RoT target HARQ processes. UEs with significant amounts of data and/or high power headroom are prioritized when allocating users to the high RoT target HARQ processes.

As another example addition, the HARQ processes with associated RoT target values may be reserved for multiple UEs and allocated fairly low rates. The HARQ processes with high RoT targets are reserved in this scenario for single UEs.

If random selection of RACH sub-channels with better coverage is used, then only the number of HARQ processes with low RoT target matters because access success probability is directly related to the probability that a UE selects a RACH sub-channel with better coverage.

Figure 18:
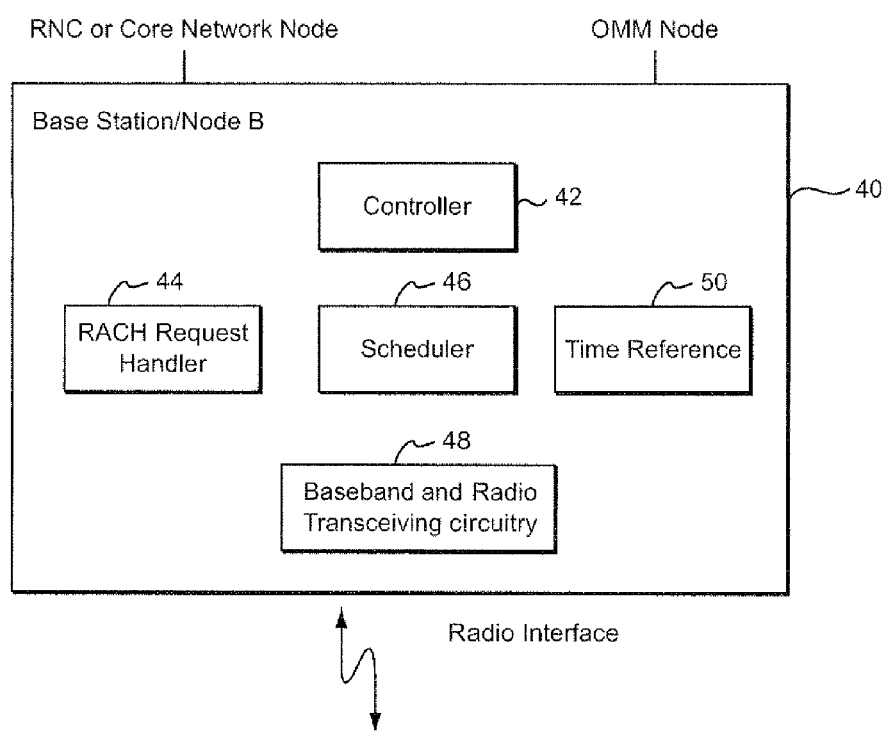
FIG. 18 is a function block diagram illustrating an example base station.

FIG. 18 is a function block diagram illustrating an example base station/NodeB 40 for implementing the procedures described above. The base station control functions may be implemented using logic circuitry, e.g., a programmed computer with memory storing data and program instructions, a DSP, a PAL, or other logic circuits. A controller 42 performs overall control operations for the base station/NodeB 40, and time reference 50 provides a timing reference for the base station/NodeB 40 and is preferably synchronized with the radio interface timing. System frame numbers (SFN) are one example timing reference. A scheduler 46 performs scheduling, buffering, and HARQ operations. A RACH request handler 42 processes RACH requests and generates appropriate acquisition signals. Although the controller 42 and scheduler 46 are shown as separate functional entities, one entity could perform both their functions. Depending on systems and implementation, the controller 42 may be implemented in a radio network controller (RNC) if random access configuration is handled by that RNC. Baseband and radio transceiving circuitry 48 performs necessary baseband signal processing and radio transceiving operations for the base station to permit radio communication with mobile radio terminals in range of the base station. The controller 42, RACH request handler 42, and scheduler 46 coordinate to perform the operations described in FIG. 17, for example, as well as the other operations described above. The base station also detects and/or receives measurement reports about radio conditions with respect to specific mobile terminals. One or more of the controller 42, RACH request handler 44, and scheduler 46 may adapt/modify RoT target values or the uplink load target value and the repeating time period associated with a RoT target value or a uplink load target value. The uplink transmission time intervals that are associated with a particular RoT target value or uplink load target value may also be changed. Moreover, changes in alignment may also be made between the RoT target value or the uplink load target value and HARQ processes associated with active mobile radio terminals as well as the HARQ processes and the acquisition indication channel (AICH).

Another non-limiting example embodiment is in the context of Coordinated MultiPoint communication, also known as a main-remote concept where spatially-distributed antenna systems are connected to the same processing unit. All cells connected to the processing unit have HARQ-processes with a low RoT-target value and with acceptably aligned TTIs.

The technology described offers a number of advantages. First, the time-varying RoT target with low RoT target for some HARQ processes will improve random access success probability at high uplink load, while enabling high hit rates for some HARQ processes. Second, the restriction of allowed sub-channels to only the ones with good coverage will improve the access success probability at least at low to moderate random access load levels. Third, available RACH subchannels subject to good coverage reduces the cell-breathing impact on the random access in WCDMA. Fourth, the good random access coverage can be associated with selected user categories, service classes, etc.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for ensuring random access coverage in one while supporting high uplink data rates in the one cell served by a base station, comprising:

identifying a shared set of radio resources associated to the one cell to be shared by multiple mobile radio terminals for uplink transmissions to the base station including requests for access to service from the base station and transmissions for active connections with the base station;

defining a first repeating time period for the one cell and a second repeating time period for the one cell different from the first repeating time period;

during the first repeating time period, scheduling uplink transmission grants for one or more active connections being supported by the one cell that permit use of a greater amount of the shared set of radio resources associated to the one cell;

during the second repeating time period, scheduling uplink transmission grants for one or more active connections being supported by the one cell that permit use of a smaller amount of the shared set of radio resources associated to the one cell smaller than the greater amount; and controlling at least some random access requests to the base station served by the one cell to occur only during the second repeating time period.

2. The method in claim 1, wherein the base station provides greater coverage during the second repeating time period than during the first repeating time period.

3. The method in claim 1, further comprising:
controlling all random access requests to the base station to occur only during the second repeating time period.

4. The method in claim 1, wherein other random access requests to the base station may occur during the first repeating time period.

5. The method in claim 1, further comprising:
scheduling uplink transmission grants for one or more active connections at higher data rates during the first repeating time period than for the second repeating time period.

6. The method in claim 1, further comprising:
providing an uplink rise over thermal (RoT) target value or an uplink load target value associated with the base station coverage area,
wherein the second repeating time period corresponds to a lower uplink rise over thermal (RoT) target value or a lower uplink load target value associated with the base station coverage area than during the first repeating time period.

7. The method in claim 6, further comprising:
aligning changes in the RoT target value or the uplink load target value with uplink transmission time intervals.

8. The method in claim 6, further comprising:
aligning changes in the RoT target value or the uplink load target value with hybrid automatic repeat request (HARQ) processes associated with active mobile radio terminals.

9. The method in claim 8, further comprising:
aligning the HARQ processes with an acquisition indication channel (AICH) used by the base station to acknowledge random access requests to the base station.

10. The method in claim 9, wherein the AICH is aligned with clock reference signal for the base station or a system frame number reference.

11. The method in claim 1, wherein the random access requests to the base station are made over a random access channel (RACH) that includes multiple RACH sub-channels, and wherein a RACH sub-channel defines a sub-set of a total set of uplink RACH access slots.

12. The method in claim 11, further comprising:
aligning specific ones of the RACH sub-channels with the second repeating time period.

13. The method in claim 1, further comprising:
determining one or more load control factors associated with the base station, and
determining whether to schedule an active mobile terminal uplink transmission during the first repeating time period or the second repeating time period based on the one or more load control factors.

14. The method in claim 13, wherein the one or more load control factors include one or more of the following: a number of mobile terminals that need to be scheduled for uplink transmission, buffer status, uplink transmit power headroom, mobile radio terminal type, category, or capability, subscription associated with a mobile radio terminal, a service requested by a mobile radio terminal, and a current radio condition.

15. The method in claim 1, further comprising:
adjusting one or both of the first repeating time period or the second repeating time period.

16. The method in claim 1, further comprising:
advertising only uplink time transmission intervals (TTIs) during the second repeating time period as allowed for mobile radio terminal random access to the base station.

17. The method in claim 1 implemented in the base station.

18. Apparatus for ensuring random access coverage in one cell while supporting high uplink data rates in the one call served by a base station, comprising:
programmable logic circuitry configured to:
identify a shared set of radio resources associated to the one cell to be shared by multiple mobile radio terminals for uplink transmissions to the base station including requests for access to service from the base station and transmissions for active connections with the base station, and
define a first repeating time period for the one cell and a second repeating time period for the one cell different from the first repeating time period;
a scheduler configured to schedule:
uplink transmission grants during the first repeating time period for one or more active connections being supported by the one cell that permit use of a greater amount of the shared set of radio resources associated to the one cell, and
uplink transmission grants during the second repeating time period for one or more active connections being supported by the one cell that permit use of a smaller amount of the shared set of radio resources associated to the one cell smaller than the greater amount; and
a controller configured to control at least some random access requests served by the one cell to the base station to occur only during the second repeating time period.

19. The apparatus in claim 18, wherein the base station provides greater coverage during the second repeating time period than during the first repeating time period.

20. The apparatus in claim 18, wherein the controller is configured to control all random access requests to the base station to occur only during the second repeating time period.

21. The apparatus in claim 18, wherein other random access requests to the base station are permitted to occur during the first repeating time period.

22. The apparatus in claim 18, wherein the scheduler is configured to schedule uplink transmission grants for one or more active connections at higher data rates during the first repeating time period than for the second repeating time period.

23. The apparatus in claim 18, wherein the programmable logic circuitry is configured to provide an uplink rise over thermal (RoT) target value or an uplink load target value associated with the base station coverage area,
wherein the second repeating time period corresponds to a lower uplink rise over thermal (RoT) target value or a lower uplink load target value associated with the base station coverage area than during the first repeating time period.

24. The apparatus in claim 23, wherein the controller is configured to align changes in the RoT target value or the uplink load target value with uplink transmission time intervals.

25. The apparatus in claim 24, wherein the controller is configured to align changes in the RoT target value or the uplink load target value with hybrid ARQ (HARQ) processes associated with active mobile radio terminals.

26. The apparatus in claim 25, wherein the controller is configured to align the HARQ processes with an acquisition indication channel (AICH) used by the base station to acknowledge random access requests to the base station.

27. The apparatus in claim 26, wherein the AICH is aligned with clock reference signal for the base station or a system frame number reference.

28. The apparatus in claim 18, wherein the random access requests to the base station are made over a random access channel (RACH) that includes multiple RACH sub-channels, and wherein a RACH sub-channel defines a sub-set of a total set of uplink RACH access slots.

29. The apparatus in claim 28, wherein the controller is configured to align specific ones of the RACH sub-channels with the second repeating time period.

30. The apparatus in claim 18, wherein the scheduler is configured to:
   determine one or more load control factors associated with the base station, and
   determine whether to schedule an active mobile terminal uplink transmission during the first repeating time period or the second repeating time period based on the one or more load control factors.

31. The apparatus in claim 30, wherein the one or more load control factors include one or more of the following: a number of mobile terminals that need to be scheduled for uplink transmission, buffer status, uplink transmit power headroom, mobile radio terminal type, category, or capability, subscription associated with a mobile radio terminal, a service requested by a mobile radio terminal, and a current radio condition.

32. The apparatus in claim 18, wherein the controller is configured to adjust one or both of the first repeating time period or the second repeating time period.

33. The apparatus in claim 18, wherein the random access requests to the base station are made over a random access channel (RACH) that includes multiple RACH sub-channels, and wherein the controller reconfigures, or notifies a radio network controller to reconfigure, base station broadcast information to advertise only RACH sub-channels during the second repeating time period as being allowed for mobile radio terminal random access to the base station.

34. The apparatus in claim 18 implemented in the base station.

35. The apparatus in claim 18, wherein the controller is configured to control at least some random access requests to the base station to occur only during the second repeating time period in the same service area served by a base station.

36. Apparatus for ensuring random access coverage in one cell while supporting high uplink data rates in the one cell served by a base station, comprising:
   means for identifying a shared set of radio resources associated to the one cell to be shared by multiple mobile radio terminals for uplink transmissions to the base station including requests for access to service from the base station and transmissions for active connections with the base station, and
   means for defining a first repeating time period for the one cell and a second repeating time period for the one cell different from the first repeating time period;
   means for scheduling during the first repeating time period uplink transmission grants for one or more active connections being supported by the one cell that permit use of a greater amount of the shared set of radio resources associate to the one cell, and
   means for scheduling during the second repeating time period uplink transmission grants for one or more active connections being supported by the one cell that permit use of a smaller amount of the shared set of radio resources associated to the one cell smaller than the greater amount; and
   means for controlling at least some random access requests to the base station serving the one cell to occur only during the second repeating time period.

\* \* \* \* \*

UNITED STATES PATENT AND TRADEMARK OFFICE
CERTIFICATE OF CORRECTION

PATENT NO. : 8,797,942 B2  
APPLICATION NO. : 12/567207  
DATED : August 5, 2014  
INVENTOR(S) : Blomgren et al.

Page 1 of 1

It is certified that error appears in the above-identified patent and that said Letters Patent is hereby corrected as shown below:

In the Specification

In Column 1, Line 15, delete "Division. Multiple" and insert -- Division Multiple --, therefor.

In Column 1, Line 26, delete "(LIE)" and insert -- (LTE) --, therefor.

In Column 10, Line 4, delete "when" and insert -- where --, therefor.

In Column 12, Line 13, delete "hit" and insert -- bit --, therefor.

In the Claims

In Column 12, Line 45, in Claim 1, delete "one" and insert -- one cell --, therefor.

In Column 14, Line 6, in Claim 18, delete "Apparatus" and insert -- An apparatus --, therefor.

In Column 16, Line 9, in Claim 36, delete "Apparatus" and insert -- An apparatus --, therefor.

Signed and Sealed this  
Twenty-fifth Day of August, 2015

Michelle K. Lee  
*Director of the United States Patent and Trademark Office*